United States Patent
Lee et al.

(10) Patent No.: US 9,456,332 B2
(45) Date of Patent: Sep. 27, 2016

(54) METHOD, BASE STATION AND USER EQUIPMENT FOR PERFORMING D2D SERVICE IN WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Eunjong Lee, Anyang-si (KR); Genebeck Han, Anyang-si (KR); Heetae Roh, Seongnam-si (KR); Jangwon Lee, Seoul (KR); Jaehoon Chung, Anyang-si (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/762,704

(22) PCT Filed: Nov. 19, 2013

(86) PCT No.: PCT/KR2013/010493
§ 371 (c)(1),
(2) Date: Jul. 22, 2015

(87) PCT Pub. No.: WO2014/115961
PCT Pub. Date: Jul. 31, 2014

(65) Prior Publication Data
US 2015/0358803 A1 Dec. 10, 2015

Related U.S. Application Data

(60) Provisional application No. 61/755,915, filed on Jan. 23, 2013.

(51) Int. Cl.
| | |
|---|---|
| *H04W 8/00* | (2009.01) |
| *H04W 4/08* | (2009.01) |
| *H04W 48/16* | (2009.01) |
| *H04W 24/08* | (2009.01) |
| *H04W 76/02* | (2009.01) |
| *H04W 48/12* | (2009.01) |

(52) U.S. Cl.
CPC ............... *H04W 8/005* (2013.01); *H04W 4/08* (2013.01); *H04W 24/08* (2013.01); *H04W 48/16* (2013.01); *H04W 76/023* (2013.01); *H04W 48/12* (2013.01)

(58) Field of Classification Search
CPC ..... H04W 8/005; H04W 24/08; H04W 4/08; H04W 48/16; H04W 76/023; H04W 48/12
See application file for complete search history.

(56) References Cited

U.S. PATENT DOCUMENTS

| | | | |
|---|---|---|---|
| 2010/0261469 A1 | 10/2010 | Ribeiro et al. | |
| 2012/0014334 A1* | 1/2012 | Oh | H04W 72/085 370/329 |
| 2012/0129540 A1* | 5/2012 | Hakola | H04W 72/042 455/450 |
| 2014/0057670 A1* | 2/2014 | Lim | H04W 8/005 455/509 |

FOREIGN PATENT DOCUMENTS

| | | |
|---|---|---|
| WO | 2012/034269 | 3/2012 |
| WO | 2012/135392 | 10/2012 |

OTHER PUBLICATIONS

PCT International Application No. PCT/KR2013/010493, Written Opinion of the International Searching Authority dated Feb. 18, 2014, 9 pages.

* cited by examiner

*Primary Examiner* — Chuong A Ngo
(74) *Attorney, Agent, or Firm* — Lee, Hong, Degerman, Kang & Walmey; Jonathan Kang; Harry Lee

(57) ABSTRACT

A method for performing device to device (D2D) communication in a wireless communication system and a user equipment for the method are disclosed. The method comprises the steps of determining at least one D2D communication group a of a plurality of D2D communication groups; and giving RNTI corresponding to the determined at least one D2D communication group a to a D2D transmitting user equipment i and a D2D receiving user equipment j of a D2D link (i, j).

17 Claims, 6 Drawing Sheets

METHOD, BASE STATION AND USER EQUIPMENT FOR PERFORMING D2D SERVICE IN WIRELESS COMMUNICATION SYSTEM

CROSS-REFERENCE TO RELATED APPLICATIONS

This application is the National Stage filing under 35 U.S.C. 371 of International Application No. PCT/KR2013/010493, filed on Nov. 19, 2013, which claims the benefit of U.S. Provisional Application No. 61/755,915, filed on Jan. 23, 2013, the contents of which are all hereby incorporated by reference herein in their entirety.

TECHNICAL FIELD

The present invention relates to wireless communication, and more particularly, to a method for performing device to device (D2D) communication in a wireless communication system, a base station supporting the method, and a user equipment performing the method.

BACKGROUND ART

Recently, mobile traffic has been rapidly increased in accordance with the spread of smart phones and tablet PCs and activation of high capacity multimedia communication. It is expected that mobile traffic will be increased twice every year. Since most of the mobile traffic is transmitted through a base station, communication service providers are faced with the problem of serious network load. In this respect, the communication service providers have increased network facilities to process traffics which are increased, and have quickly commercialized the next generation mobile communication standard that can efficiently process high capacity traffic such as mobile WiMAX and long term evolution (LTE). However, another solution will be required to handle the amount of traffics which will be more increased in the future.

Device to device (D2D) communication refers to the distributed communication technology that directly transfers traffic between adjacent nodes without using infrastructure such as a base station. In a D2D communication environment, each node such as a portable terminal discovers another user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE

Technical Problem

An object of the present invention devised to solve the conventional problem is to provide a method for allowing a device to device (D2D) user equipment to perform D2D communication in a wireless communication system.

Another object of the present invention is to provide a D2D user equipment for performing D2D communication in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve these objects and other advantages and in accordance with the purpose of the specification, as embodied and broadly described herein, a method for allowing a base station to support device to device (D2D) communication in a wireless communication system comprises the steps of determining at least one D2D communication group a of a plurality of D2D communication groups; and giving RNTI corresponding to the determined at least one D2D communication group a to a D2D transmitting user equipment i and a D2D receiving user equipment j of a D2D link (i, j), wherein the step of determining at least one D2D communication group a of a plurality of D2D communication groups includes determining the at least one D2D communication group a, which satisfies a first condition and a second condition, by receiving information on the at least one D2D communication group, which satisfies the first condition, from the D2D receiving user equipment j and receiving information on the at least one D2D communication group, which satisfies the second condition, from the D2D transmitting user equipment i, and the second condition is obtained by receiving a first group interference value from the D2D receiving user equipment within the plurality of D2D communication groups, determining a minimum value of the first group interference value as a second group interference value, and transmitting the second group interference value to the D2D transmitting user equipment i.

The information on the at least one D2D communication group a, which satisfies the first condition, satisfies the following Equation A:

$$\frac{P_j}{N + \sum_{k \in G_a^T} I_j^k} \geq SINR_j^{TH}. \quad \text{[Equation A]}$$

The information on the at least one D2D communication group a, which satisfies the second condition, satisfies the following Equation B:

$$\frac{P_m}{N + I_m^i + \sum_{k \in G_a^T \setminus \{T_m\}} I_m^k} \geq SINR_m^{TH}, \quad \text{[Equation B]}$$

for all $m \in G_a^R$.

The method further comprises the step of giving RNTI corresponding to the D2D link (i, j) to the D2D receiving user equipment j and the D2D transmitting user equipment i if the at least one communication group a, which satisfies the first condition and the second condition, is not determined.

In another aspect of the present invention, a method for allowing a device to device (D2D) user equipment to perform D2D communication in a wireless communication system comprises the steps of periodically transmitting a first reference signal; receiving a second reference signal to measure strength of the received signal and an interference value; calculating a resultant value of a predetermined condition by using the measured strength and interference value; and transmitting the calculated resultant value to a base station.

The reference signal is periodically transmitted using a resource block allocated to a specific D2D group in accordance with a predetermined pattern.

If the user equipment is a receiving user equipment j of a D2D communication link (i, j), the method further comprises the steps of receiving the second reference signal from a D2D transmitting user equipment j of the D2D communication link (i, j) to measure strength of Pj of the received signal, and measuring an interference value $$\sum_{k \in G_a^T} I_j^k$$

from the D2D transmitting user equipment within the D2D communication group a to transmit information on at least one D2D communication group a, which satisfies a predetermined condition such as the following Equation A, to the base station:

$$\frac{P_j}{N + \sum_{k \in G_a^T} I_j^k} \geq SINR_j^{TH}. \quad \text{[Equation A]}$$

If the user equipment is a receiving user equipment m within a D2D communication group a, further comprising the steps of receiving the second reference signal from a D2D transmitting user equipment Tm within the D2D communication group a to measure strength of Pj of the received signal, measuring an interference value $$\sum_{k \in G_a^T \setminus \{T_m\}} I_m^k$$

from the D2D transmitting user equipment except for the transmitting user equipment Tm within the D2D communication group, calculating $I_m^{MARGIN}$ through the following Equation C, and transmitting calculated value to the base station as a first group interference allowance value:

$$\frac{P_m}{SINR_m^{TH}} - \left(N + \sum_{k \in G_a^T \setminus \{T_m\}} I_m^k\right) = I_m^{MARGIN}. \quad \text{[Equation C]}$$

The method further comprises the steps of receiving a second group interference allowance value $I_{Group\ a}^{MARGIN}$ from the base station, measuring a total sum $$\sum_{m \in G_a^R} I_m^i$$

of interferences of a plurality of receiving user equipments within the D2D communication group a, and transmitting information on at least one D2D communication group a, which satisfies a predetermined condition such as the following Equation D, to the base station:

$$\sum_{m \in G_a^R} I_m^i \leq I_{Group\ a}^{MARGIN}. \quad \text{[Equation D]}$$

Advantageous Effects

According to the embodiments of the present invention, a plurality of D2D user equipments may increase efficiency in use of resources by simultaneously transmitting data using same resources in D2D communication.

Also, user equipments, which perform D2D communication, may be grouped, whereby the D2D user equipments within the same group may reuse resources.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
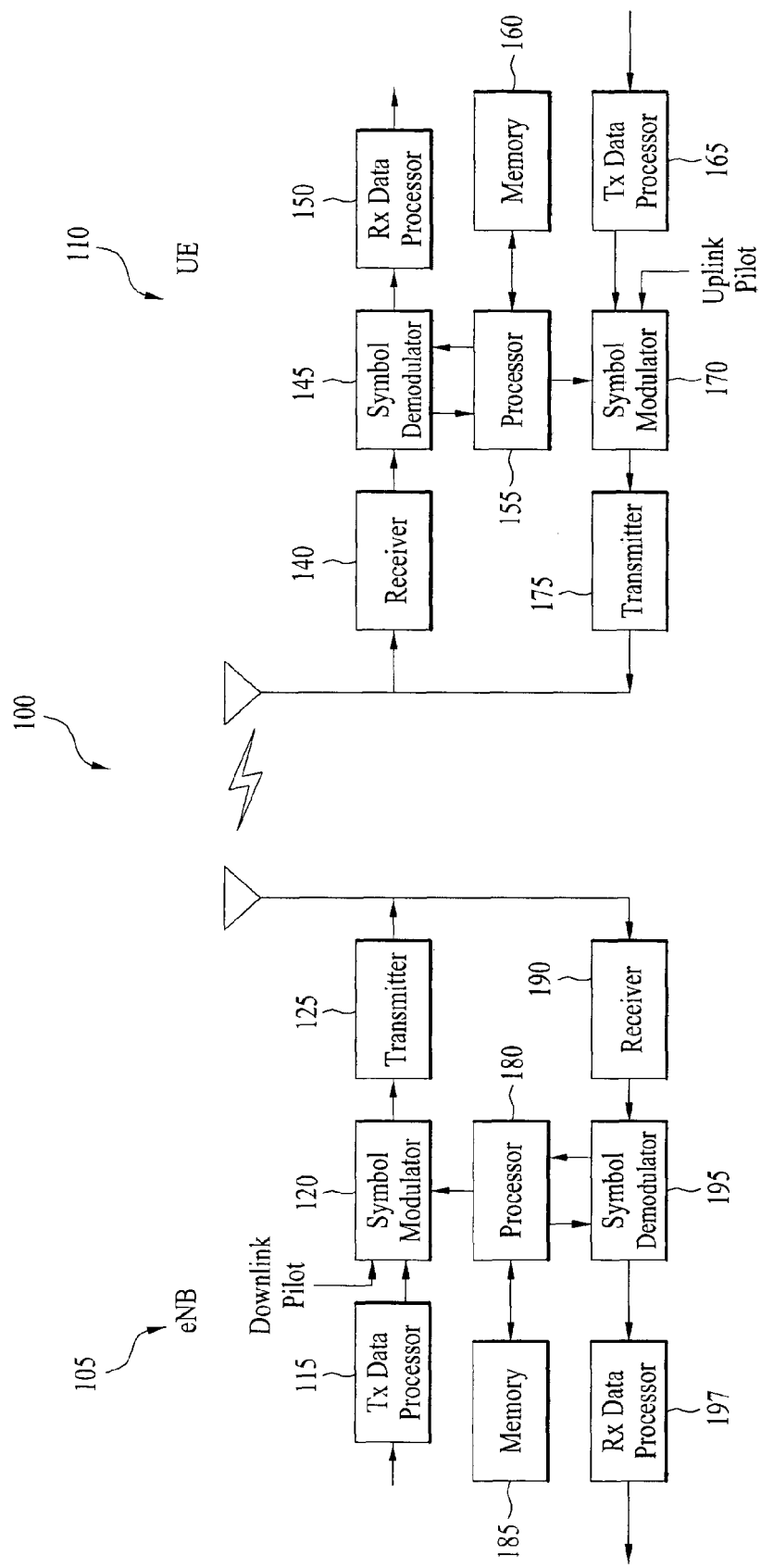
FIG. 1 is a block diagram illustrating configurations of a base station 105 and a user equipment 110 in a wireless communication system.

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on the assumption that the mobile communication system is the 3GPP LTE or LTE-A system, the following description may be applied to other mobile communication systems except for particular matters of the 3GPP LTE or LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts Moreover, in the following description, it is assumed that a mobile terminal refers to a mobile or fixed type user equipment such as a user equipment (UE), a mobile station (MS), and an advanced mobile station (AMS). Also, it is assumed that the base station refers to a random node of a network terminal, such as Node B, eNode B, and access point (AP), which performs communication with the user equipment. In this specification, although the description is made based on the IEEE 802.16 system, the description of the present invention may be applied to various other communication systems.

In a wireless communication system, the user equipment may receive information from the base station through a downlink, and may also transmit information to the base station through an uplink. Examples of information transmitted from and received by the user equipment include data and various kinds of control information. Various physical channels exist depending on types and usage of information transmitted from or received by the mobile station.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system.

Also, specific terminologies hereinafter used in the embodiments of the present invention are provided to assist understanding of the present invention, and various modifications may be made in the specific terminologies within the range that they do not depart from technical spirits of the present invention.

FIG. 1 is a block diagram illustrating configurations of a base station 105 and a user equipment 110 in a wireless communication system.

Although one base station 105 and one user equipment 110 (including D2D user equipment) are shown for simplification of a wireless communication system 100, the wireless communication system 100 may include one or more base stations and/or one or more user equipments.

Referring to FIG. 1, the base station 105 may include a transmitting (Tx) data processor 115, a symbol modulator 120, a transmitter 125, a transmitting and receiving antenna 130, a processor 180, a memory 185, a receiver 190, a symbol demodulator 195, and a receiving (Rx) data processor 197. The user equipment 110 may include a Tx data processor 165, a symbol modulator 170, a transmitter 175, a transmitting and receiving antenna 135, a processor 155, a memory 160, a receiver 140, a symbol demodulator 155, and an Rx data processor 150. Although the antennas 130 and 135 are respectively shown in the base station 105 and the user equipment 110, each of the base station 105 and the user equipment 110 includes a plurality of antennas. Accordingly, the base station 105 and the user equipment 110 according to the present invention support a multiple input multiple output (MIMO) system. Also, the base station 105 according to the present invention may support both a single user-MIMO (SU-MIMO) system and a multi user-MIMO (MU-MIMO) system.

On a downlink, the Tx data processor 115 receives traffic data, formats and codes the received traffic data, interleaves and modulates (or symbol maps) the coded traffic data, and provides the modulated symbols ("data symbols"). The symbol modulator 120 receives and processes the data symbols and pilot symbols and provides streams of the symbols.

The symbol modulator 120 multiplexes the data and pilot symbols and transmits the multiplexed data and pilot symbols to the transmitter 125. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 receives the streams of the symbols and converts the received streams into one or more analog symbols. Also, the transmitter 125 generates downlink signals suitable for transmission through a radio channel by additionally controlling (for example, amplifying, filtering and frequency upconverting) the analog signals. Subsequently, the downlink signals are transmitted to the user equipment through the antenna 130.

In the configuration of the user equipment 110, the antenna 135 receives the downlink signals from the base station 105 and provides the received signals to the receiver 140. The receiver 140 controls (for example, filters, amplifies and frequency downcoverts) the received signals and digitalizes the controlled signals to acquire samples. The symbol demodulator 145 demodulates the received pilot symbols and provides the demodulated pilot symbols to the processor 155 to perform channel estimation.

Also, the symbol demodulator 145 receives a frequency response estimation value for the downlink from the processor 155, acquires data symbol estimation values (estimation values of the transmitted data symbols) by performing data demodulation for the received data symbols, and provides the data symbol estimation values to the Rx data processor 150. The Rx data processor 50 demodulates (i.e., symbol de-mapping), deinterleaves, and decodes the data symbol estimation values to recover the transmitted traffic data.

Processing based on the symbol demodulator 145 and the Rx data processor 150 is complementary to processing based on the symbol demodulator 120 and the Tx data processor 115 at the base station 105.

On an uplink, the Tx data processor 165 of the user equipment 110 processes traffic data and provides data symbols. The symbol modulator 170 receives the data symbols, multiplexes the received data symbols with the pilot symbols, performs modulation for the multiplexed symbols, and provides the streams of the symbols to the transmitter 175. The transmitter 175 receives and processes the streams of the symbols and generates uplink signals. The transmitting antenna 135 transmits the generated uplink signals to the base station 105.

The uplink signals are received in the base station 105 from the user equipment 110 through the antenna 130, and the receiver 190 processes the received uplink signals to acquire samples. Subsequently, the symbol demodulator 195 processes the samples and provides data symbol estimation values and the pilot symbols received for the uplink. The Rx data processor 197 recovers the traffic data transmitted from the user equipment 110 by processing the data symbol estimation values.

The processors 155 and 180 of the user equipment 110 and the base station 105 respectively command (for example, control, adjust, manage, etc.) the operation at the user equipment 110 and the base station 105. The processors 155 and 180 may respectively be connected with the memories 160 and 185 that store program codes and data. The memories 160 and 185 respectively connected to the processor 180 store operating system, application, and general files therein.

In the present invention, although the processor 155 of the user equipment and the processor 180 of the base station process signal and data except for a function of receiving or transmitting a signal, the processors 155 and 180 will not be mentioned specifically for convenience of description. The processors 155 and 180 may be regarded to perform a series of operations such as data processing not a function of receiving or transmitting a signal even though the processors are not mentioned specifically.

Each of the processors 155 and 180 may be referred to as a controller, a microcontroller, a microprocessor, and a microcomputer. Meanwhile, the processors 155 and 180 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 155 and 180.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 155 and 180, or may be stored in the memories 160 and 185 and driven by the processors 155 and 180.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

In a cellular network or cellular communication, a cellular user equipment accesses the base station to perform communication, receives control information for data transmission and reception from the base station, and then transmits and receives data to and from the base station. In other words, since the cellular user equipment transmits and receives data through the base station, the cellular user equipment transmits its data to the base station to transmit the data to another cellular user equipment, and the base station that has received the data transmits the data to another cellular user equipment. In this way, since one cellular user equipment can transmit data to another cellular user equipment through the base station only, the base station performs scheduling for a channel and resources for data transmission and reception and transmits the scheduled information to each cellular user equipment. As described above, in order to perform communication between the cellular user equipments through the base station, it is required that channel and resource for data transmission and reception should be allocated to the base station. However, device to device communication (hereinafter, referred to as D2D communication) has a structure that a D2D user equipment directly transmits and receives a signal to and from a desired user equipment without going through a base station or a relay station. Accordingly, a design of a channel and resource structure, which enables signal transmission and reception even without control of a base station, will be required. In this case, it is required to design the channel and resource structure to allow a D2D user equipment to avoid collision with a channel for the existing cellular user equipment and a resource allocated for the existing cellular user equipment when the D2D user equipment is operated on the cellular network.

The D2D communication is a short distance communication system, which enables direct communication between user equipments without going through e-NodeB if the user equipments are located at distances adjacent to each other.

The D2D communication may achieve a data transmission rate higher than that of the existing communication system and increase the number of user equipments, which can use the same resource at the same time, due to a communication system without going through e-NodeB, thereby enhancing efficiency in resource.

On the network that supports the D2D communication, there exist a cellular user who receives the existing communication services and a D2D user who receives D2D services. In this case, in the same manner as the cellular user, examples of modes for D2D communication of the D2D user include a cellular communication mode for communication between the user equipments through e-NodeB and a D2D communication mode for direct communication between the user equipments without going through e-NodeB.

At this time, in case of the cellular communication mode for data transmission and reception through the e-NodeB, since the D2D user should have no interference with another cellular user, a dedicated resource block (RB) should be allocated to the D2D user of the cellular communication mode. However, in case of the D2D communication mode for direct communication between the user equipment, a dedicated resource block may be allocated to a D2D link formed by two user equipments which desire to perform mutual communication, or data may simultaneously be transmitted using a resource block which is being used by another cellular user.

The present invention suggests a method for enhancing efficiency of resource use by simultaneously transmitting data using same resource block if an interference level between corresponding D2D links of D2D user equipments, which use a D2D communication mode, is acceptable.

In the present invention, the D2D user equipments, which use the D2D communication mode, is allocated with a dedicated RB without reusing RB used by the D2D user, and, if possible, reuse RB only used by the other D2D user equipments which perform communication in accordance with the D2D communication mode. A set of D2D links where data are simultaneously transmitted in accordance with the D2D communication mode by using the same RB will be defined as a D2D group.

Hereinafter, signs used in the Equation will be defined by the following Table.

TABLE 1

| | |
|---|---|
| (i, j) | D2D link between D2D transmitting user equipment I and D2D receiving user equipment j |
| $T_m$ | D2D transmitting user equipment of D2D receiving user equipment m within specific D2D group |
| m | D2D receiving user equipment within specific D2D group |
| $SINR_j^{TH}$ | Required SINR of D2D receiving user equipment j |
| $P_j$ | Strength of signal received D2D transmitting user equipment i paired with D2D receiving user equipment j |
| $I_j^i$ | Interference between D2D receiving user equipment j and D2D transmitting user equipment i, which are paired with each other |
| N | Noise power |
| K | The number of D2D groups |
| G | Set of D2D groups |
| $G_a^T$ | Set of transmitting user equipments of specific D2D group a |
| $G_a^R$ | Set of receiving user equipments of specific D2D group a |
| $I_m^{MARGIN}$ | Interference margin of D2D receiving user equipment m |
| $I_{Group\ a}^{MARGIN}$ | Interference margin of D2D receiving user equipment a |

If a plurality of D2D user equipments, which perform communication in accordance with the D2D communication mode, exist, signaling overhead may occur seriously in identifying channel state information (CSI) among all the D2D user equipments. Accordingly, in order to reduce signaling overhead, it is preferable to identify CSI only of a link between two D2D user equipments which desire to transmit and receive data to and from each other without identifying CSI of a link formed by the other user equipments. In this respect, in order to identify CSI of the D2D link, if a type of a reference signal of the transmitting user equipment of each D2D link and reference signal configuration information as to when the corresponding reference signal is transmitted are notified from the base station to the receiving user equipment of each D2D link, the transmitting user equipment of each D2D link periodically transmits the reference signal to its receiving user equipment by using RB allocated thereto, and the receiving user equipment identifies CSI of its D2D link by receiving the reference signal. At this time, the user equipment j which is the receiving user equipment of each D2D link (i, j) may measure receiving strength $P_j$ of the signal transmitted from its transmitting user equipment i.

In order that the D2D user equipment, which performs communication in accordance with the D2D communication mode, successfully transmits data through its D2D link, signal to interference plus noise ratio (SINR) of the receiving user equipment should be greater than a certain level (that is, required SINR). Accordingly, if the D2D transmitting user equipment i and the D2D receiving user equipment j, which are newly accessed to the network, desire to transmit data through the D2D link (i, j) in accordance with the D2D communication mode, in order that the corresponding D2D link simultaneously transmits data by using RB allocated to the D2D group a, two conditions should be satisfied as follows.

1. Condition of D2D Receiving User Equipment j:

Does interference from transmitting user equipments belonging to D2D group a to the D2D receiving user equipment j satisfy required SINR of the D2D receiving user equipment j?

2. Condition of D2D Transmitting User Equipment i:

Does interference that affects receiving user equipments belonging to D2D group a from the D2D transmitting user equipment i satisfy required SINR of the receiving user equipment belonging to the D2D group a?

In the present invention, the former condition will be defined as 'D2D receiving condition', and the latter condition will be defined as 'D2D transmitting condition'.

The aforementioned two conditions may be expressed by the following Equations.

1. D2D Receiving Condition (Condition of D2D Receiving User Equipment j):

$$\frac{P_j}{N + \sum_{k \in G_a^T} I_j^k} \geq SINR_j^{TH} \quad \text{[Equation 1]}$$

Pj means strength of a signal received by the D2D receiving user equipment j from the D2D transmitting user equipment i, N means strength of noise, $\sum_{k \in G_a} I_j^k$ means a value of interference received by the D2D receiving user equipment j from a plurality of transmitting user equipments of a specific D2D communication group a, and $SINR_j^{TH}$ means SINR required for the D2D receiving user equipment j.

According to the aforementioned Equation 1, if a value by obtained by dividing strength of the signal received by the D2D receiving user equipment j from the D2D transmitting user equipment i by the interference and noise values received by the D2D receiving user equipment j from the plurality of transmitting user equipments of the specific D2D group a is greater than SINR required for the tD2D receiving user equipment j, the condition for using RB of the specific D2D group a is satisfied when the D2D receiving user equipment j performs communication with the D2D transmitting user equipment i.

2. D2D Transmitting Condition (Condition of D2D Transmitting User Equipment i):

$$\frac{P_m}{N + I_m^i + \sum_{k \in G_a^T \setminus \{T_m\}} I_m^k} \geq SINR_m^{TH}, \quad \text{[Equation 2]}$$

for all $m \in G_a^R$ $P_m$ means strength of a signal received by the D2D receiving user equipment m within the specific D2D group a from the D2D transmitting user equipment $T_m$ of the D2D receiving user equipment m, N means strength of noise, $$\sum_{k \in G_a^T \setminus \{T_m\}} I_m^k$$

means a value of interference received by the D2D receiving user equipment m belonging to the specific D2D group a from the other transmitting user equipments except for the transmitting user equipment $T_m$ among the plurality of transmitting user equipments of the D2D communication group a, to which the D2D receiving user equipment m belongs, $SINR_m^{TH}$ means SINR required for the D2D receiving user equipment m within the specific D2D group a, and $G_a^R$ means a set of D2D receiving user equipments within the specific D2D group a. At this time, $I_m^i$ means an interference value that affects the receiving user equipment m belonging to the D2D group a from the transmitting user equipment i of the D2D link (i, j), wherein the interference value may be identified by transmitting a control signal between the corresponding D2D user equipments.

According to the aforementioned Equation 2, if a value by obtained by dividing strength $P_m$ of the signal received by the D2D receiving user equipment m within the specific D2D group a from the D2D transmitting user equipment $T_m$ by a sum value of noise, the interference value, which affects the receiving user equipment m belonging to the D2D group a from the transmitting user equipment i of the D2D link (i, j) and the interference value received by the D2D receiving user equipment m belonging to the specific D2D group a from the other transmitting user equipments except for the transmitting user equipment $T_m$ among the transmitting user equipments of the D2D group a is greater than SINR required for the tD2D receiving user equipment m, the condition for using RB of the specific D2D group a is satisfied when the D2D transmitting user equipment i performs communication with the D2D receiving user equipment j.

In the meantime, in order to minimize signaling overhead, since the transmitting user equipment belonging to each D2D link does not transmit a reference signal to the D2D user equipments other than its receiving user equipment, CSI measurement is not performed, whereby the D2D receiving user equipment m cannot identify $I_m^i$. Accordingly, the present invention suggests that the transmitting user equipment i of the D2D link (i, j) identifies the condition for transmission.

To this end, the Equation 2 may be changed as follows.

$$I_m^i \leq \frac{P_m}{SINR_m^{TH}} - \left(N + \sum_{k \in G_a^T \setminus \{T_m\}} I_m^k\right), \quad \text{[Equation 3]}$$

for all $m \in G_a^R$

At this time, the Equation 3 satisfies the following Equation 4.

$$\sum_{m \in G_a^R} I_m^i \leq \min_{m \in G_a^R} \left[\frac{P_m}{SINR_m^{TH}} - \left(N + \sum_{k \in G_a^T \setminus \{T_m\}} I_m^k\right)\right] \quad \text{[Equation 4]}$$

At this time, since the Equation 4 becomes the sufficient condition of the Equation 3, if the condition of the Equation 4 is satisfied, the Equation 4 satisfies the Equation 3 or the Equation 2.

At this time, if $$\frac{P_m}{SINR_m^{TH}} - \left(N + \sum_{k \in G_a^T \setminus \{T_m\}} I_m^k\right)$$

of the Equation 4 is defined using $I_m^{MARGIN}$, the Equation 4 may be changed to the following Equation 5.

$$\sum_{m \in G_a^R} I_m^i \leq \min_{m \in G_a^R} I_m^{MARGIN} \quad \text{[Equation 5]}$$

$I_m^{MARGIN}$ is an interference margin of the D2D receiving user equipment m and may satisfy the required SINR condition of the D2D receiving user equipment m only if the interference value received from the transmitting user equipment i of the D2D link which is newly accessed is smaller than the corresponding value.

At this time, if $$\min_{m \in G_a^R} I_m^{MARGIN}$$

of the Equation 5 is defined using $I_{Group\ a}^{MARGIN}$, the Equation 5 may be changed to the following Equation 6.

$$\sum_{m \in G_a^R} I_m^i \leq I_{Group\ a}^{MARGIN} \quad \text{[Equation 6]}$$

According to the Equation 6, $I_{Group\ a}^{MARGIN}$ is a group interference margin of the D2D group a and may satisfy the required SINR condition of the receiving user equipments belonging to the D2D group a if a sum of interference that affects all the receiving user equipments of the D2D group a is smaller than the corresponding value.

Finally, the D2D transmitting user equipment i may search for the D2D group that satisfies the condition for transmission of the Equation 2 if it determines whether there is a D2D group that satisfies the Equation 6 as the condition for transmission.

Figure 2:
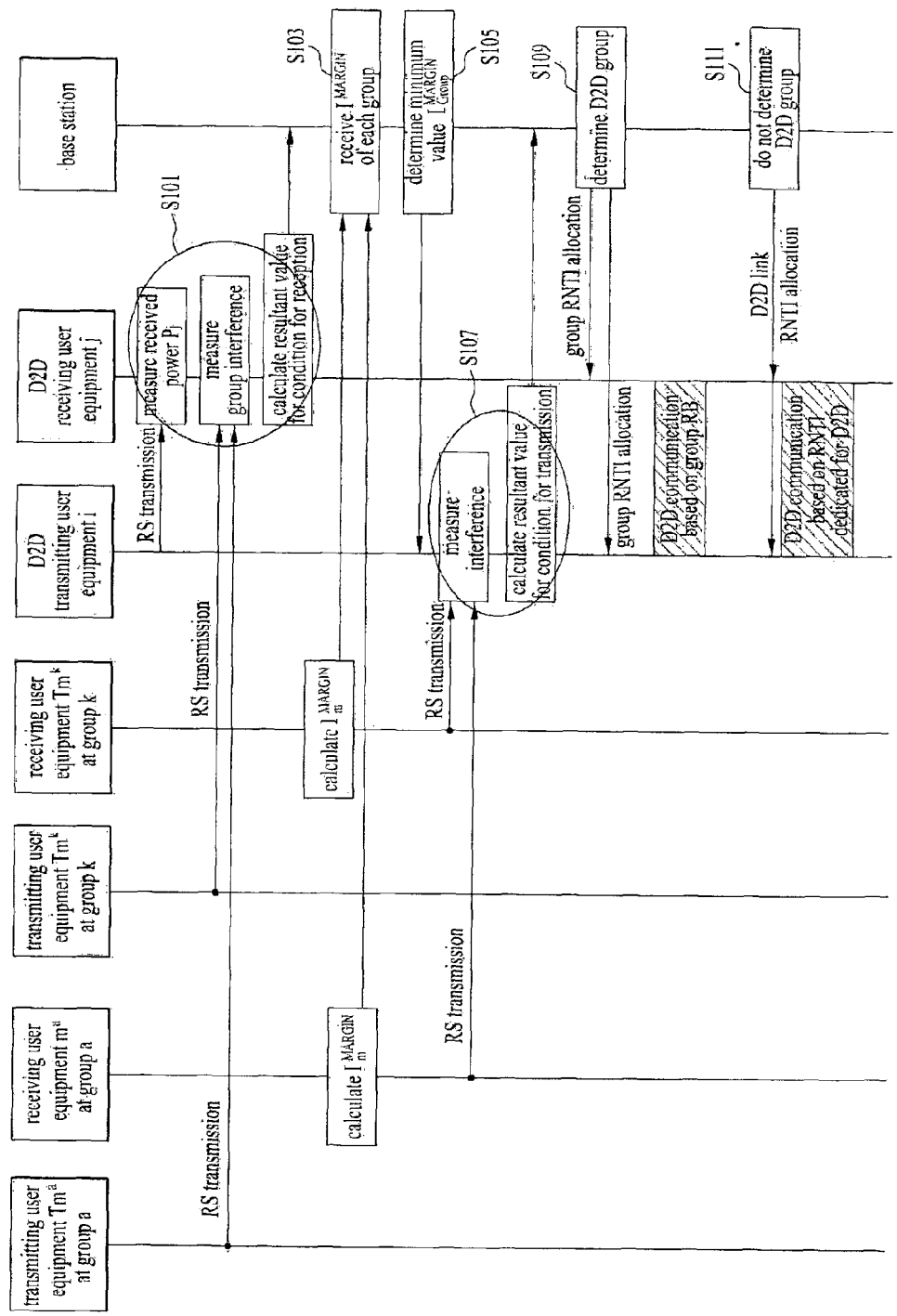
FIG. 2 is a flow chart illustrating a method for determining a group, which satisfies a receiving condition and a transmitting condition according to one embodiment of the present invention.

FIG. 2 is a flow chart illustrating a method for determining a group, which satisfies a receiving condition and a transmitting condition according to one embodiment of the present invention.

Referring to FIG. 2, the base station receives a resultant value of a condition for reception from the D2D receiving user equipment j (S101). The step S101 will be described later with reference to FIG. 3.

Afterwards, the base station receives $I_m^{MARGIN}$ from D2D receiving user equipments within a plurality of D2D groups (S103). The base station defines $$\min_{m \in G_a^R} I_m^{MARGIN}$$

corresponding to the minimum value among the received $I_m^{MARGIN}$ as $I_{Group\ a}^{MARGIN}$, and transmits the defined $I_{Group\ a}^{MARGIN}$ to the D2D transmitting user equipment i paired with the D2D receiving user equipment (S105). The steps 103 and 105 will be described later with reference to FIG. 4.

At the step S105, the D2D transmitting user equipment i that has received $I_{Group\ a}^{MARGIN}$ measures $$\sum_{m \in G_a^R} I_i^m$$

from the D2D receiving user equipments within the specific group and transmits the resultant value of a condition for transmission to the base station (S107). The step S107 will be described later with reference to FIG. 5.

The base station determines the D2D group, which satisfies the two conditions, by using the resultant value of the condition for reception and the resultant value of the condition for transmission, which are received through the steps S101 and S105 (S109). At the step S109, if the D2D group, to which the D2D link (i,j) may belong to, is determined, the base station notifies the transmitting user equipment i and the receiving user equipment j of the D2D link (i,j) of ID (for example, group-RNTI) of the selected D2D group. Afterwards, the base station notifies the transmitting user equipment i and the receiving user equipment j of the D2D link (i,j) of RB information of the D2D group, to which the D2D link (i,j) belongs, by using group-RNTI of the corresponding D2D group. Accordingly, the transmitting user equipment i and the receiving user equipment j may perform D2D communication by using RB of the corresponding D2D group.

In the meantime, if the D2D group, to which the D2D link (i,j) may belong to, is not determined at the step S109, the base station allocates orthogonal RB to the D2D link (i,j) and notifies the transmitting user equipment i and the receiving user equipment j of the D2D link (i,j) of the allocated RB by using RNTI of the D2D link (i,j). Accordingly, the transmitting user equipment i and the receiving user equipment j perform D2D communication by using their dedicated RB.

Figure 3:
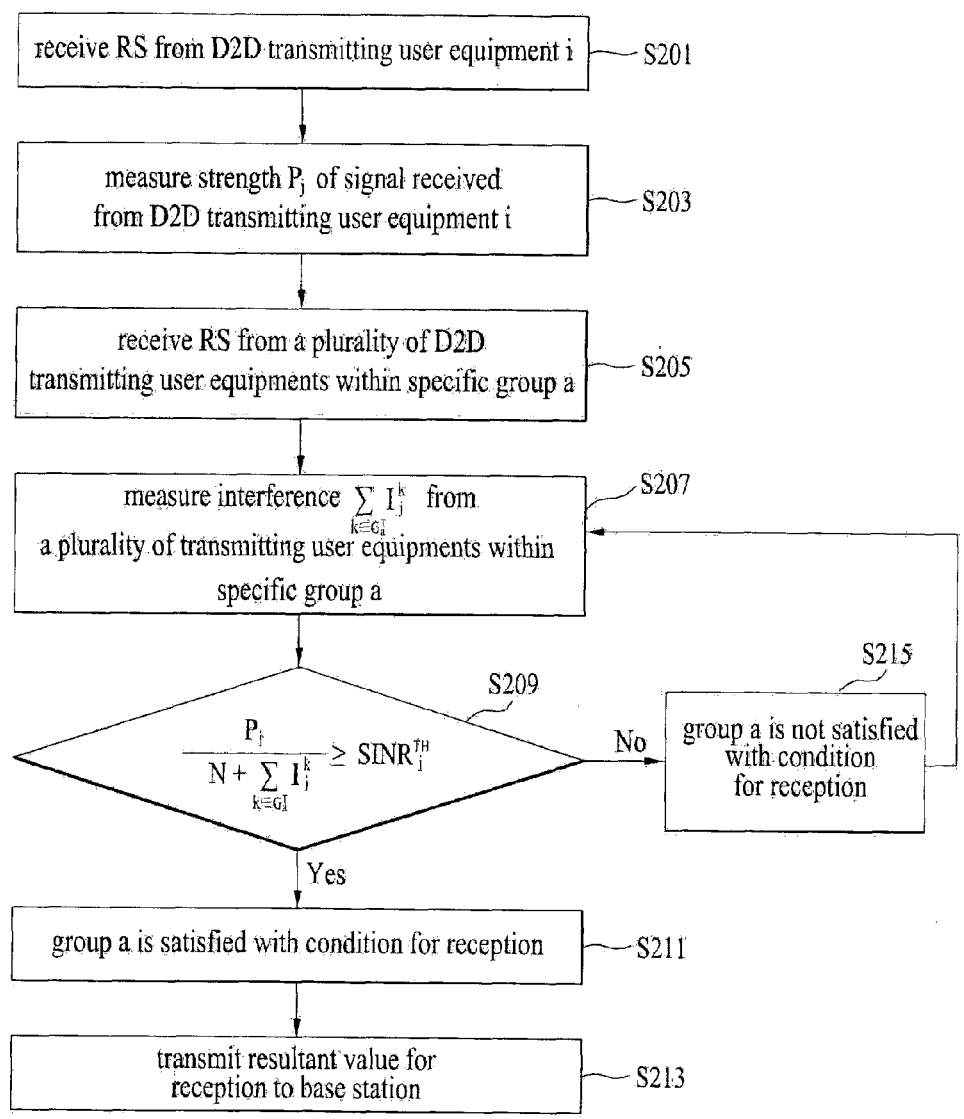
FIG. 3 is a flow chart illustrating a method for calculating the result of a receiving condition of a D2D receiving user equipment according to one embodiment of the present invention.

FIG. 3 is a flow chart illustrating a method for calculating the result of a receiving condition of a D2D receiving user equipment according to one embodiment of the present invention.

The aforementioned step S101 will be described in more detail with reference to FIG. 3. First of all, the D2D receiving user equipment j receives a reference signal from the D2D transmitting user equipment i (S201). At this time, the D2D receiving user equipment j may measure strength $P_j$ of a signal received from the D2D transmitting user equipment i by measuring strength of a signal received when the reference signal is received (S203).

Then, the D2D receiving user equipment j receives reference signals from a plurality of user equipments within each D2D group (S205). At this time, the plurality of transmitting user equipment within a specific D2D group a transmits the reference signal by using RB used by a D2D group to which the transmitting user equipments belong. The D2D receiving user equipment j may measure $$\sum_{k \in G_a^T} I_j^k$$

by measuring strength of the reference signals transmitted from the transmitting user equipments of the specific D2D group a (S207).

The D2D receiving user equipment j determines whether the specific D2D group a satisfies the condition for reception by using the aforementioned Equation 1 (S209).

$$\frac{P_j}{N + \sum_{k \in G_a^T} I_j^k} \geq SINR_j^{TH} \qquad [\text{Equation 1}]$$

If the D2D receiving user equipment j determines that the group a satisfies the condition for reception through the step S209 (S211), the D2D receiving user equipment j transmits the determined result to the base station (S213). Meanwhile, if the D2D receiving user equipment j determines that the group a does not satisfy the condition for reception through the step S209 (S215), the D2D receiving user equipment j returns to the step S207 to determine whether another specific group b satisfies the condition for reception.

Figure 4:
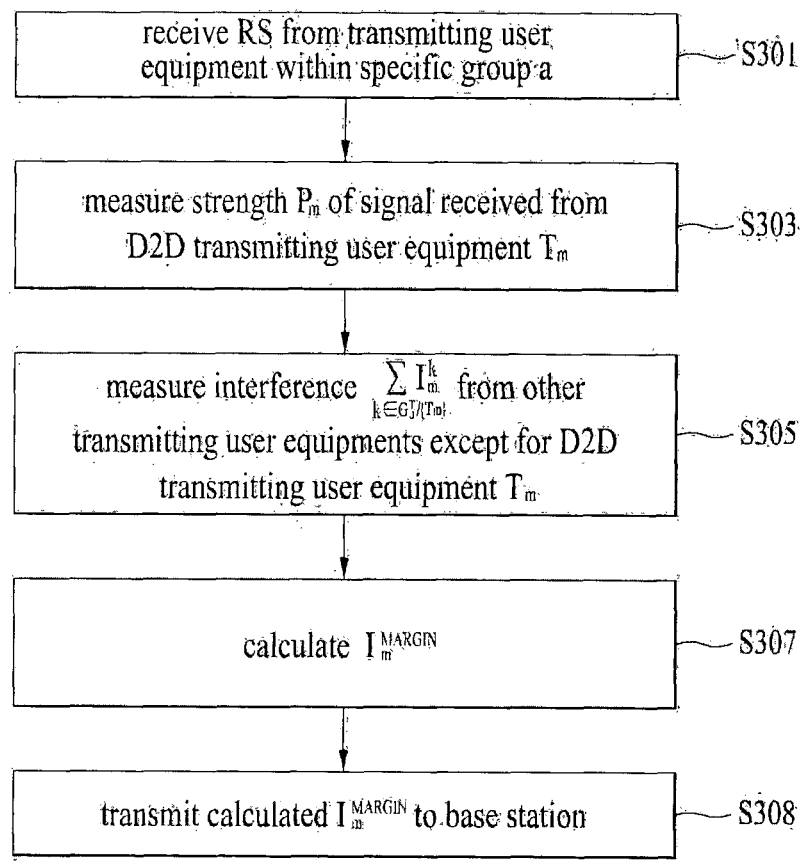
FIG. 4 is a flow chart illustrating a method for calculating interference of a receiving user equipment belonging to a specific D2D group a according to one embodiment of the present invention.

FIG. 4 is a flow chart illustrating a method for calculating interference of a receiving user equipment belonging to a specific D2D group a according to one embodiment of the present invention.

The aforementioned steps S103 and S105 will be described in more detail with reference to FIG. 4. The D2D receiving user equipment m belonging to the specific D2D group a receives a reference signal from the transmitting user equipment within the D2D group a to which the D2D receiving user equipment m belongs (S301). The D2D receiving user equipment m may measure strength $P_m$ of a signal received from the D2D transmitting user equipment $T_m$ paired therewith by measuring strength of a signal received when the reference signal is received from the D2D transmitting user equipment $T_m$ (S303).

In the meantime, the D2D receiving user equipment m belonging to the specific D2D group a measures $$\sum_{k \in G_a^T \setminus \{T_m\}} I_m^k$$

by reference signals, which is measured from the other transmitting user equipments except for its transmitting user equipment $T_m$ among the transmitting user equipments of the D2D group a (S305).

$$\sum_{k \in G_a^T \setminus \{T_m\}} I_m^k$$

is the value or interference of the D2D receiving user equipment m belonging to the specific D2D group a from the other transmitting user equipments except for the transmitting user equipment $T_m$.

In the aforementioned Equations 4 and 5, since $I_m^{MARGIN}$ is defined as $$\frac{P_m}{SINR_m^{TH}} - \left(N + \sum_{k \in G_a^T \setminus \{T_m\}} I_m^k\right),$$

$I_m^{MARGIN}$ is obtained through the steps S303 and 305 (S307), whereby the obtained $I_m^{MARGIN}$ is transmitted to the base station (S309).

Figure 5:
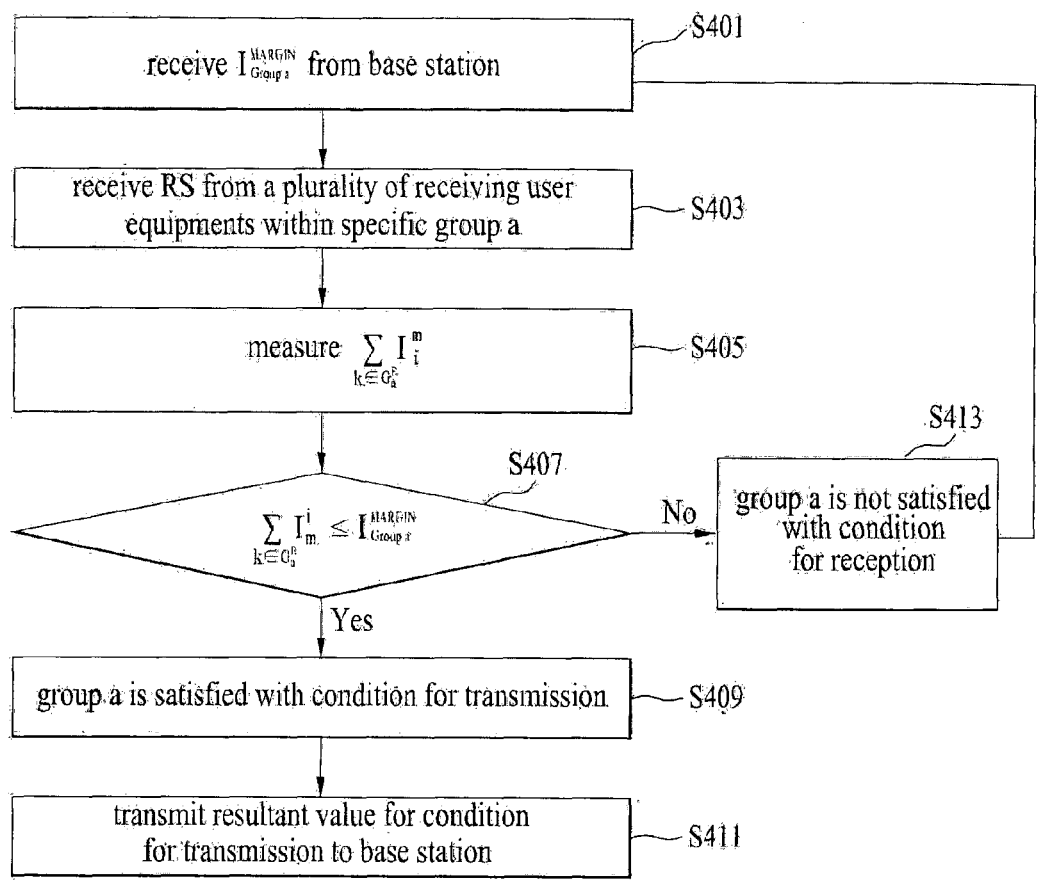
FIG. 5 is a flow chart illustrating a method for calculating the result of a transmitting condition of a D2D transmitting user equipment according to one embodiment of the present invention.

FIG. 5 is a flow chart illustrating a method for calculating the result of a transmitting condition of a D2D transmitting user equipment according to one embodiment of the present invention.

The aforementioned step S107 will be described in more detail with reference to FIG. 5. Although the aforementioned Equation 2 satisfies the condition for transmission, since it is a required condition of the Equation 6, the Equation 6 will be regarded as the sufficient condition of the condition for transmission. Accordingly, the D2D transmitting user equipment i may determine a specific D2D group that satisfies the Equation 6 which is the sufficient condition of the condition for transmission.

$$\sum_{m \in G_a^R} I_m^i \leq I_{Group\ a}^{MARGIN} \quad \text{[Equation 6]}$$

In more detail, the D2D transmitting user equipment i receives $I_{Group\ a}^{MARGIN}$, which is transmitted from the D2D receiving user equipment m within the specific D2D group a, from the base station (S401). In the Equation 5, since $$\min_{m \in G_a^R} I_m^{MARGIN}$$

is defined as $I_{Group\ a}^{MARGIN}$, $I_{Group\ a}^{MARGIN}$ means the smallest value of $I_m^{MARGIN}$ received at the step S309.

Afterwards, the D2D transmitting user equipment i identifies a total sum $$\sum_{m \in G_a^R} I_m^i$$

of interference that affects all the receiving user equipments of the D2D group a to which the D2D transmitting user equipment i belongs. To this end, the receiving user equipments belonging to each D2D group transmit the reference signals by using RB allocated to the corresponding D2D groups. Then, the D2D transmitting user equipment i may receive the reference signals from the plurality of receiving user equipments within the D2D group a (S403), and may measure strength $$\sum_{m \in G_a^R} I_i^m$$

of the reference signals to identify $$\sum_{m \in G_a^R} I_m^i$$

(S405).

The D2D transmitting user equipment i determines whether the specific D2D group a satisfies the condition for transmission, by using the Equation 6 (S407).

$$\sum_{m \in G_a^R} I_m^i \leq I_{Group\ a}^{MARGIN} \quad \text{[Equation 6]}$$

If the D2D transmitting user equipment i determines that the specific D2D group a satisfies the condition for transmission, through the step S407 (S409), the D2D transmitting user equipment i transmits the determined result to the base station (S411). Meanwhile, if the D2D transmitting user equipment i determines that the specific D2D group a does not satisfy the condition for transmission, through the step S407 (S413), the D2D transmitting user equipment i returns to the step S401 to determine whether another specific group b satisfies the condition for transmission.

Figure 6:
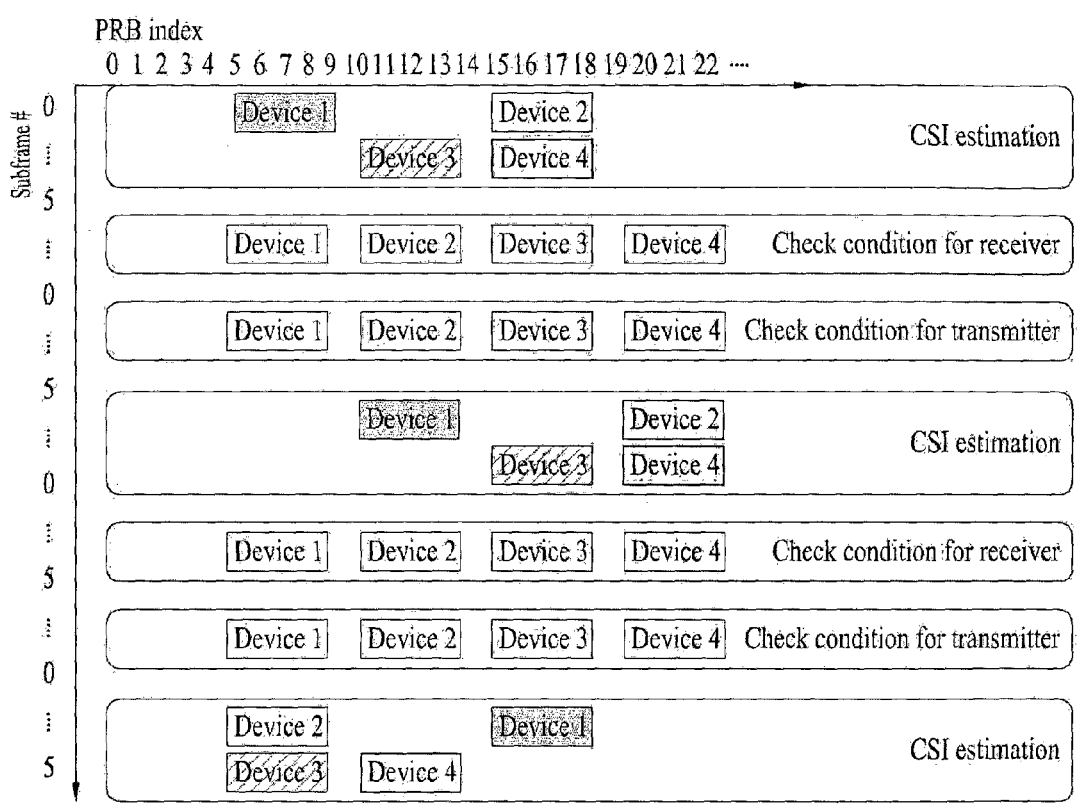
FIG. 6 is a diagram illustrating one example of a subframe used during transmission of a reference signal according to one embodiment of the present invention.

FIG. 6 is a diagram illustrating one example of a subframe used during transmission of a reference signal according to one embodiment of the present invention.

A subframe pattern used during transmission of a reference signal in FIG. 6 represents a pattern of a sounding reference signal (SRS) for identifying a channel status of an uplink between the user equipment and the base station in the existing LTE system. In FIG. 6, patterns for 'condition for reception' and 'condition for transmission' are respectively the patterns for the steps S101 and S107 of FIG. 2. The transmitting user equipment belonging to each D2D group transmits its reference signal by using RB allocated to the corresponding D2D group in accordance with the pattern for 'condition for reception'. The receiving user equipment belonging to each D2D group transmits its reference signal by using RB allocated to the corresponding D2D group in accordance with the pattern for 'condition for transmission'. The pattern for transmission of the reference signal in FIG. 2 may notify each D2D user equipment of SRS configuration in the same manner that SRS configuration is notified to the user equipment in the existing LTE system.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The method for performing or supporting D2D communication in a wireless communication system and the apparatus for the same may be used industrially for various communication systems such as 3GPP LTE, LTE-A and IEEE 802.

The invention claimed is:

1. A method for supporting device to device (D2D) communication at a base station in a wireless communication system, the method comprising:
determining at least one D2D communication group a of a plurality of D2D communication groups; and
giving a group identifier corresponding to the determined at least one D2D communication group a to a D2D transmitting user equipment i and a D2D receiving user equipment j of a D2D link (i, j), wherein the D2D link (i, j) is a communication link for the D2D communication between the D2D transmitting user equipment i and the D2D receiving user equipment j,
wherein the determining at least one D2D communication group a of a plurality of D2D communication groups includes:
receiving information on the at least one D2D communication group a, which satisfies a first condition, from the D2D receiving user equipment j,
receiving information on the at least one D2D communication group a, which satisfies a second condition, from the D2D transmitting user equipment i,
determining the at least one D2D communication group a, which satisfies the first condition and the second condition, wherein the second condition is obtained by receiving a first group interference value from the D2D receiving user equipment j within the plurality of D2D communication groups,
determining a minimum value of the first group interference value as a second group interference value, and
transmitting the second group interference value to the D2D transmitting user equipment i,
wherein the first condition is satisfied when an interference value received by the D2D receiving user equipment j from a plurality of transmitting user equipment k within the D2D communication group a satisfies a signal to interference plus noise ration (SINR) required for the D2D receiving user equipment j.

2. The method according to claim 1, wherein the information on the at least one D2D communication group a, which satisfies the first condition, satisfies the following Equation A:

$$\frac{P_j}{N + \sum_{k \in G_a^T} I_j^k} \geq SINR_j^{TH}, \qquad \text{[Equation A]}$$

$P_j$ means strength of a signal received by the D2D receiving user equipment j from the D2D transmitting user equipment i,
N means strength of noise, $$\sum_{k \in G_a^T} I_j^k$$

means the interference value received by the D2D receiving user equipment j from the plurality of transmitting user equipments within the D2D communication group a,
$I_j^k$ means the interference value received by the D2D receiving user equipment j from the plurality of transmitting user equipments k,
$G_a^T$ means a set of D2D transmitting user equipments within the D2D communication group a, and
$SINR_j^{TH}$ means SINR required for the D2D receiving user equipment j.

3. The method according to claim 1, wherein the information on the at least one D2D communication group a, which satisfies the second condition, satisfies the following Equation B:

$$\frac{P_m}{N + I_m^i + \sum_{k \in G_a^T \setminus \{T_m\}} I_m^k} \geq SINR_j^{TH}, \text{ for all } m \in G_a^R, \qquad \text{[Equation B]}$$

$P_m$ means strength of a signal received by the D2D receiving user equipment m within the D2D communication group a from the D2D transmitting user equipment $T_m$,
N means strength of noise,
$I_m^i$ means an interference value that affects the receiving user equipment m belonging to the D2D communication group a from the transmitting user equipment i, $$\sum_{k \in G_a^T \setminus \{T_m\}} I_m^k$$

means an interference value received by the D2D receiving user equipment m from the other transmitting user equipments except for the transmitting user equipment $T_m$ among a plurality of transmitting user equipments k of the D2D communication group a,
$I_m^k$ means an interference value received by the D2D receiving user equipment m from the plurality of transmitting user equipment k,
$SINR_m^{TH}$ means SINR required for the D2D receiving user equipment m,
m means the receiving user equipment within the D2D communication group a,
$G_a^T$ means a set of D2D transmitting user equipments within the D2D communication group a, and
$G_a^R$ means a set of D2D receiving user equipments within the D2D communication group a.

4. The method according to claim 1, further comprising giving the group identifier corresponding to the D2D link (i, j) to the D2D receiving user equipment j and the D2D transmitting user equipment i if the at least one communication group a, which satisfies the first condition and the second condition, is not determined.

5. A method for performing device to device (D2D) communication at a D2D user equipment in a wireless communication system, the method comprising:
periodically transmitting a first reference signal;
measuring strength of a received second reference signal and an interference value by receiving a second reference signal; and
when the D2D user equipment is a D2D receiving user equipment j of a D2D communication link (i, j) which is a communication link for the D2D communication between a D2D transmitting user equipment i and the D2D receiving user equipment j:
receiving the second reference signal from the D2D transmitting user equipment i of the D2D communication link (i, j) to measure strength of the received second signal; and
measuring an interference value from the D2D transmitting user equipment within a D2D communication group a to transmit information on at least one D2D communication group a to a base station,
wherein the D2D communication group a satisfies a first condition when the interference value received by the D2D receiving user equipment j from a plurality of transmitting user equipments k within the D2D communication group a satisfies a signal to interference plus noise ratio (SINR) required for the D2D receiving user equipment j.

6. The method according to claim 5, wherein the reference signal is periodically transmitted using a resource block allocated to a specific D2D communication group in accordance with a predetermined pattern.

7. The method according to claim 5, wherein when the D2D user equipment is the receiving user equipment j of the D2D communication link (i, j),
the information on the at least one D2D communication group a, which satisfies the first condition, satisfies the following Equation A:

$$\frac{P_j}{N + \sum_{k \in G_a^T} I_j^k} \geq SINR_j^{TH}, \quad \text{[Equation A]}$$

$P_j$ means strength of a signal received by the D2D receiving user equipment j from the D2D transmitting user equipment i,
N means strength of noise, $$\sum_{k \in G_a^T} I_j^k$$

means the interference value received by the D2D receiving user equipment j from the plurality of transmitting user equipments k within the D2D communication group a,
$I_j^k$ means the interference value received by the D2D receiving user equipment j from the plurality of transmitting user equipments k,
$G_a^T$ means a set of D2D transmitting user equipments within the D2D communication group a, and
$SINR_j^{TH}$ means the SINR required for the D2D receiving user equipment j.

8. The method according to claim 5, wherein when the D2D user equipment is a D2D receiving user equipment m within a D2D communication group a, the method further comprises:
receiving the second reference signal from a D2D transmitting user equipment $T_m$ within the D2D communication group a to measure strength of $P_j$ of the received second reference signal,
measuring an interference value $$\sum_{k \in G_a^T \setminus \{T_m\}} I_m^k$$

from a D2D transmitting user equipment except for the transmitting user equipment $T_m$ within the D2D communication group a,
calculating $I_m^{MARGIN}$ through the following Equation C, and
transmitting the calculated value to the base station as a first group interference allowance value:

$$\frac{P_m}{SINR_m^{TH}} - \left(N + \sum_{k \in G_a^T \setminus \{T_m\}} I_m^k\right) = I_m^{MARGIN}, \quad \text{[Equation C]}$$

$P_m$ means strength of the second reference signal received by the D2D receiving user equipment m within the D2D communication group a from the D2D transmitting user equipment Tm,
N means strength of noise,
$I_m^k$ means an interference value received by the D2D receiving user equipment m from the plurality of transmitting user equipments k, $$\sum_{k \in G_a^T \setminus \{T_m\}} I_m^k$$

means an interference value received by transmitting user equipments other than the transmitting user equipment $T_m$ among the plurality of transmitting user equipments k of the D2D communication group a to which the D2D receiving user equipment m belongs,
$G_a^T$ means a set of D2D transmitting user equipments within the D2D communication group a,
$SINR_m^{TH}$ means SINR required for the D2D receiving user equipment m, and
$I_m^{MARGIN}$ means an interference margin of the D2D receiving user equipment m.

9. The method according to claim 8, further comprising:
receiving a second group interference allowance value $I_{Group\ a}^{MARGIN}$ from the base station,
measuring a total sum $$\sum_{m \in G_a^R} I_m^i$$

of interferences of a plurality of receiving user equipments within the D2D communication group a, and
transmitting information on at least one D2D communication group a, which satisfies a second condition defined by the following Equation D, to the base station:

$$\sum_{m \in G_a^R} I_m^i \leq I_{Group\,a}^{MARGIN}, \quad \text{[Equation D]}$$

$$\sum_{m \in G_a^R} I_m^i \quad 5$$

means a total sum of interferences that affect all receiving user equipments of the D2D communication group a from the D2D transmitting user equipment i, $I_m^i$ means an interference value that affects the receiving user equipment m belonging to the D2D communication group a from the transmitting user equipment i, $I_j^k$ means an interference value received by the D2D receiving user equipment j from the plurality of transmitting user equipments k, $G_a^R$ means a set of D2D receiving user equipments within the D2D communication group a, and $I_{Group\,a}^{MARGIN}$ means a minimum value of a first group interference value, and satisfies $$I_{Group\,a}^{MARGIN} = \min_{m \in G_a^R} I_m^{MARGIN}.$$

10. A base station supporting device to device (D2D) communication in a wireless communication system, the base station comprising:
 a controller configured to determine at least one D2D communication group a of a plurality of D2D communication groups; and
 a wireless communication module configured to give a group identifier corresponding to the determined at least one D2D communication group a to a D2D transmitting user equipment i and a D2D receiving user equipment j of a D2D link (i, j), wherein the D2D link (i, j) is a communication link for the D2D communication between the D2D transmitting user equipment i and the D2D receiving user equipment j,
 wherein:
 the wireless communication module receives information on the at least one D2D communication group a, which satisfies a first condition, from the D2D receiving user equipment j, and receives information on the at least one D2D communication group a, which satisfies a second condition, from the D2D transmitting user equipment i,
 the controller determines the at least one D2D communication group a, which satisfies the first condition and the second condition,
 the second condition is obtained by receiving a first group interference value from the D2D receiving user equipment j within the plurality of D2D communication groups, a minimum value of the first group interference value determined as a second group interference value, and the second group interference value transmitted to the D2D transmitting user equipment i, and
 the first condition is satisfied when an interference value received by the D2D receiving user equipment j from a plurality of transmitting user equipments k within the D2D communication group a satisfies a signal to interference plus noise ratio (SINR) required for the D2D receiving user equipment j.

11. The base station according to claim 10, wherein the information on the at least one D2D communication group a, which satisfies the first condition, satisfies the following Equation A, and the information on the at least one D2D communication group a, which satisfies the second condition, satisfies the following Equation B:

$$\frac{P_j}{N + \sum_{k \in G_a^T} I_j^k} \geq SINR_j^{TH} \text{ and} \quad \text{[Equation A]}$$

$$\frac{P_m}{N + I_m^i + \sum_{k \in G_a^T \setminus \{T_m\}} I_m^k} \geq SINR_m^{TH}, \text{ for all } m \in G_a^R, \quad \text{[Equation B]}$$

Pj means strength of a signal received by the D2D receiving user equipment j from the D2D transmitting user equipment i, N means strength of noise, $\sum_{k \in G_a^T} I_j^k$ means an interference value received by the D2D receiving user equipment j from the plurality of transmitting user equipments k within the D2D communication group a, $I_j^k$ means the interference value received by the D2D receiving user equipment j from the plurality of transmitting user equipments k, $SINR_j^{TH}$ means an SINR required for the D2D receiving user equipment j, Pm means strength of a signal received by a D2D receiving user equipment m within the D2D communication group a from a D2D transmitting user equipment Tm, $I_m^i$ means an interference value that affects the receiving user equipment m belonging to the D2D communication group a from the transmitting user equipment i, $$\sum_{k \in G_a^T \setminus \{T_m\}} I_m^k$$

means an interference value received by the D2D receiving user equipment m from transmitting user equipments other than the D2D transmitting user equipment Tm among the plurality of transmitting user equipments k of the D2D communication group a, $I_m^k$ means an interference value received by the D2D receiving user equipment m from the plurality of transmitting user equipments k, $SINR_m^{TH}$ means a signal to interference plus noise ratio (SINR) required for the D2D receiving user equipment m, m means the D2D receiving user equipment m within the D2D communication group a, $G_a^T$ means a set of D2D transmitting user equipments within the D2D communication group a, and $G_a^R$ means a set of D2D receiving user equipments within the D2D communication group a.

12. The base station according to claim 10, wherein the controller gives the group identifier corresponding to the D2D link (i, j) to the D2D receiving user equipment j and the D2D transmitting user equipment i when the at least one communication group a, which satisfies the first condition and the second condition, is not determined.

13. A device to device (D2D) user equipment performing D2D communication in a wireless communication system, the D2D user equipment comprising:
 a transmitter configured to periodically transmit a first reference signal; and a processor configured to receive a second reference signal to measure strength of the transmitted first reference signal and an interference value, wherein when the D2D user equipment is a D2D receiving user equipment j of a D2D communication link (i, j) which is a communication link for the D2D communication between a D2D transmitting user equipment i and the D2D receiving user equipment j:

the processor is further configured to receive the second reference signal from the D2D transmitting user equipment j of the D2D communication link (i, j) to measure strength of the transmitted first reference signal, measure an interference value from the D2D transmitting user equipment j within a D2D communication group a to transmit information on at least one D2D communication group a to a base station, and the D2D communication group a satisfies the first condition when the interference value received by the D2D receiving user equipment j from a plurality of transmitting user equipments k within the D2D communication group a satisfies a signal to interference plus noise ratio (SINR) required for the D2D receiving user equipment j.

14. The D2D user equipment according to claim 13, wherein the first reference signal is periodically transmitted using a resource block allocated to a specific D2D group in accordance with a predetermined pattern.

15. The D2D user equipment according to claim 13, wherein, when the D2D user equipment is the receiving user equipment j of the D2D communication link (i, j), the information on the at least one D2D communication group a, which satisfies the first condition, satisfies the following Equation A:

$$\frac{P_j}{N + \sum_{k \in G_a^T} I_j^k} \geq SINR_j^{TH}, \quad \text{[Equation A]}$$

$P_j$ means strength of a signal received by the D2D receiving user equipment j from the D2D transmitting user equipment i, N means strength of noise, $$\sum_{k \in G_a^T} I_j^k$$

means the interference value received by the D2D receiving user equipment j from the plurality of transmitting user equipments k within the D2D communication group a, $I_j^k$ means the interference value received by the D2D receiving user equipment j from the plurality of transmitting user equipments k, $SINR_j^{TH}$ means the SINR required for the D2D receiving user equipment j, and $G_a^T$ means a set of D2D transmitting user equipments within the D2D communication group a.

16. The D2D user equipment according to claim 13, wherein, when the user equipment is a receiving user equipment m within a D2D communication group a, the processor is further configured to:

receive the second reference signal from a D2D transmitting user equipment Tm within the D2D communication group a to measure strength of Pj of the received signal, measure an interference value $$\sum_{k \in G_a^T \setminus \{T_m\}} I_m^k$$

from the D2D transmitting user equipment except for the transmitting user equipment Tm within the D2D communication group, calculate $I_m^{MARGIN}$ through the following Equation C, and transmit the calculated value to the base station as a first group interference allowance value:

$$\frac{P_m}{SINR_m^{TH}} - \left(N + \sum_{k \in G_a^T \setminus \{T_m\}} I_m^k\right) = I_m^{MARGIN}, \quad \text{[Equation C]}$$

Pm means strength of the signal received by the D2D receiving user equipment m within the D2D communication group a from the D2D transmitting user equipment, N means strength of noise, $$\sum_{k \in G_a^T \setminus \{T_m\}} I_m^k$$

means an interference value received by transmitting user equipments other than the transmitting user equipment Tm among the plurality of transmitting user equipments k of the D2D communication group a to which the D2D receiving user equipment m belongs, $I_m^k$ means the interference value received by the D2D receiving user equipment m from the plurality of transmitting user equipments k, $G_a^T$ means a set of D2D transmitting user equipments within the D2D communication group a, $SINR_m^{TH}$ means SINR required for the D2D receiving user equipment m, $I_{Group\ a}^{MARGIN}$ means a minimum value of a first group interference value, and $I_m^{MARGIN}$ means an interference margin of the D2D receiving user equipment m.

17. The D2D user equipment according to claim 16, wherein the processor is further configured to:

receive a second group interference allowance value $I_{Group\ a}^{MARGIN}$ from the base station, measure a total sum $$\sum_{m \in G_a^R} I_m^i$$

of interferences of a plurality of receiving user equipments within the D2D communication group a, and transmit information on at least one D2D communication group a, which satisfies a second condition defined by the following Equation D, to the base station:

$$\sum_{m \in G_a^R} I_m^i \leq I_{Group\,a}^{MARGIN}, \quad \text{[Equation D]}$$

$$\sum_{m \in G_a^R} I_m^i$$

means a total sum of interferences that affect all of the plurality of receiving user equipments of the D2D communication group a from the D2D transmitting user equipment i, $I_m^i$ means an interference value that affects the receiving user equipment m belonging to the D2D communication group a from the transmitting user equipment i, $G_a^R$ means a set of D2D receiving user equipments within the D2D communication group a, and $I_{Group\,a}^{MARGIN}$ means a minimum value of the first group interference value, and satisfies $$I_{Group\,a}^{MARGIN} = \min_{m \in G_a^R} I_m^{MARGIN}.$$

\* \* \* \* \*